Roy M. Jenkins,
INVENTOR.
BY.

Golove & Kleinberg,
ATTORNEYS.

Roy M. Jenkins,
INVENTOR.

BY.

Golove & Kleinberg,
ATTORNEYS.

Roy M. Jenkins,
INVENTOR.
BY.

Golove & Kleinberg,
ATTORNEYS.

United States Patent Office 3,424,539
Patented Jan. 28, 1969

1 2

3,424,539
FOUNTAIN PEN

Roy M. Jenkins, Burbank, Calif., assignor to Lindy Pen Company Incorporated, North Hollywood, Calif.
Filed Feb. 9, 1965, Ser. No. 431,377
U.S. Cl. 401—292 13 Claims
Int. Cl. A46b *11/00;* B43k *1/02*

ABSTRACT OF THE DISCLOSURE

A fountain pen is formed of a plurality of elongated elements in which adjacent surfaces have applied thereto different texture patterns to provide capillary ink passages. In a preferred embodiment, elongated elements are molded as one integral unit which is "rolled up" to form the writing assembly.

The present invention relates to writing instruments and more particularly to a novel fountain pen combining the ease of writing of fluent ink instruments with the smooth writing action of ball point writing instruments.

Fluid writing instruments have long been divided into three basic types. A first type employs a marking tip or nib through which a writing fluid flows or is conveyed to the writing surface. This type includes the earliest pens from the split nib quill pens to the modern, metal split nib pen; a second type usually referred to as a "marking" instrument, maintains a capillary wick in fluid communication with a supply of writing fluid. The third type is best characterized by the ball point pen, which utilizes a rotating ball to transport a more viscous writing fluid, from a supply to the writing surface.

The split nib pen has long been used because of its ability to produce a mark of consistent width and density for the life of the point so long as the supply of ink is adequate and the writting pressure uniform. Usually the pen is of metal and preferably includes a writing nib with a tapered writing tip, having a longitudinal slit extending from a pierce in the nib. Ink flows by capillary action through the slit to the tip during writing. The width of the slit varies as a result of the pressure of writing. Otherwise, ink is held and stored by capillary attraction.

The common split nib pen is "position sensitive" and requires that the instrument be carefully oriented in the writer's grasp to produce satisfactory results. Rotation of the pen point makes writing more difficult and there are "dead" positions from which the pen will not write.

Multiple nib lining and drawing pens have been devised and described for example, in the patents to Chinn, No. 82,598; Heath, No. 423,684; Wardin, No. 1,345,044; Aramian, No. 1,621,450; and Frank, No. 1,903,965. Each essentially relies on the capillary action of the split between adjacent nibs to provide an adequate flow of ink to the point.

The ball point pen which has been introduced in recent years, combines the advantages of a pencil (which transmits writing perssure through several thicknesses of paper to provide multiple copies and which is not particularly sensitive to the orientation of the instrument) with the desired end of producing an ink mark, usually more permanent and durable than a pencil mark.

Despite the wide acceptance and popularity of the ball point pen, many critics have objected to the application of substantial writing pressure, required of most ball point pens, to produce a satisfactory mark. Many find themselves fatigued after extended use of such a pen. Further, certain writing surfaces cause slippage of the ball and consequently a skip in the writing. Further, as the ball wears the socket in which it is mounted, the ink flow increases and ink builds up on the point which is left on the surface as a blot.

The marking instrument, long used for its broad marking wick, has in recent years, been modified by attempts to find a wick-point which will provide a writing line comparable to that produced by either the nib pen or the ball point pen. Natural and synthetic fibers have been bundled into a small tip, through which ink flows by capillary action. Such instruments have not achieved sufficient rigidity at the writing point to prevent the collapse of the fibers at the very tip. As a result, an instrument providing a fine line initially quickly breaks down and soon produces a relatively broad mark, unsuitable for most normal writing purposes. More rigid fibers of comparable dimensions would result in a point that could easily scratch or tear the writing surface, which, in turn would result in an unduly broad or thick mark.

Still other attempts to modify a wick-type marking instrument for writing purposes have resulted in a narrowed writing point, but the resulting inadequate flow of the conventional inks used, precludes a satisfactory writing instrument. A more fluent ink, which might overcome the problem, creates yet additional problems, dealing with evaporation rates, permeability of the ink reservoir and pen barrel, and absorption by and drying on the writing surface.

A different approach to provide a wick-type marking instrument having a more rigid structure is exemplified by the patent to Roth, No. 2,396,058 in which a porous solid provides capillary paths for a writing fluid to a writing tip. Here, the choice of the materials and the size of the particles of the solid determines the size of the capillary channels, which are joined at random on a probabilistic basis. Such a method leaves the provision of a continuous capillary path between reservoir and writing tip, too much to chance, without any real control or adjustment being practical.

It is therefore desirable to have a writing instrument that can utilize conventional writing or marking inks, that affords the writing ease of a nib or wick, yet permits the wide range of writing attitudes possible with a ball point pen, and which does not require the fatiguing writing pressures normally experienced with a ball point pen. The instrument should be easily fabricated and permit a relatively inexpensive construction. Such an instrument can be expendable and therefore non-refillable, although if a more permanent unit is desired, the ink supply may be added to from time to time with various refilling modification. However, in an inexepensive, expendable pen, the ink supply can be entirely self contained without provision for refill.

The present invention provides such an instrument which utilizes a novel writing point. The point comprises a plurality of molded elongated elements hereinafter referred to as "strands" to form an elongated solid. It is understood that the conventional definition of "strand" contemplates a twisted or braided configuration, but for the present purposes that term has been adopted in preference to "filament" or other generic term which would encompass the elongated structure comprising an element of the present invention. The adjacent faces are spaced and/or textured to provide paths of capillary dimensions for ink from one end of the strands to the other and which is shaped into a writing tip. In a preferred embodiment, each strand is a segment of a regular polygon. It is to be understood that "polygon" is intended to include geometric shapes with as few as three sides. When the plurality of strands are bundled in interfitting alignment and inserted into a pen barrel, fluid communication is established with the ink supply and the adjacent faces of the individual strands provide capillary passages for the flow of ink.

If a cross section is taken of a bundle of strands, orthogonal to the axis, a central channel will be seen, with a plurality of channels radiating therefrom, all of capillary dimensions for the ink being used. The individual strands are textured to improve the capillary properties of the interfitting faces in the bundle. The strands are tapered so that the bundle provides a writing tip which is substantially symmetrical about the axis and which enables writing substantially independent of the attitude of the writing instrument.

In additional embodiments, shoulders are molded on the "bases" or outer-surfaces of selected strands, so that the extent of insertion into the pen barrel can be limited by the shoulders. Still other embodiments provide molded bosses or cam surfaces on the base of each strand, so that once a bundle is in place, the cam surfaces are frictionally engaged by the pen barrel to maintain the strands in a tight, compact bundle. At the same time, these cam surfaces provide a vent to the atmosphere from the ink supply through the barrel between adjacent cam surfaces.

In the preferred embodiment, the individual strands are molded with a triangular cross section. When assembled, a regular, polygonal prism is formed. As will be easily seen, a polygonal solid fitted into a circular orifice will provide a plurality of air passages external to the solid for communication with the interior of the pen.

The preferred method for producing the strands comprising a point involves a molding or casting process, in which the inner faces of the mold are textured, for example on one side with a series of circular striations or scratches and on the opposite or facing side, with linear or lateral striations or scratches. The "base" surfaces of the plurality of strands are provided with a connecting band or web so that the plurality of strands can be cast side-by-side in a single coherent unit which is later "rolled" to form the polygonal solid. An eight-sectioned point has proved to be eminently satisfactory and, accordingly, each strand has, an apex angle of approximately 45°, so that an octagonal "solid" is formed by the bundling of eight, substantially identical, strands.

In an alternative embodiment, a plurality of strands are molded to radiate from a common, central rod. To provide a similar, eight-sectioned point, eight strands are formed, each of substantially triangular cross section and each with an apex angle of approximately 45°. When the individual strands are collapsed inward to be in parallel alignment with the axis, as by inserting the rod end into a circular orifice of a pen barrel, an octagonal body is again produced, co-axial with the stem rod.

Obviously, the number of strands used to make up a point, is determined by the fluidity of the ink, the capillary properties of the ink with the material used in the making of the strands, and the breadth of the mark to be written. To assure uniform writing properties, independent of the rotational position and attitude of the pen, six or more strands are deemed preferable. However, classical drafting pens would use two "strands," while the prior art has disclosed a pen using three metal points, in a conical taper. Experiments with four strands have produced instruments that were not insensitive to rotation of the pen, but it is suspected that even a four-strand pen would be satisfactory, if a suitably fluid ink were chosen.

In the preferred embodiment, a point is provided with a uniform, straight line taper, to the writing tip. It is believed, however, that depending upon the wearing properties of the point material employed, other, non-linear, tapers might be preferable, so that the width of the mark produced would be less dependent upon the wear of the tip in the axial direction.

Yet other embodiments employ either all-metal strands, or metal tips affixed to plastic strands, to provide a long wearing, highly polished writing tip that is not affected by abrasion with the writing surface and which will continually provide a smooth even contact between point and writing surface. In such embodiments, writing tips of suitable metals such as osmium or iridium can be integrally molded onto the ends of the individual strands. Alternatively, each strand could be made of a suitable metal, in a process similar to that employed for the plastics. Similarly, strands could be made of ceramic, glass, or any other suitable material.

Plastics, such as the acetal copolymers, have obvious advantages of cost, ease of molding or casting and their extreme fidelity to the mold. Accordingly, a plastic strand is the first choice, especially for an expendable pen.

Accordingly, it is an object of the present invention to provide a fountain pen having a unique point structure suitable for use with conventional writing inks.

It is yet another object of the present invention to provide an improved fountain pen having an omnidirectional point.

It is still a separate object of the present invention to provide a fountain pen having a plastic writing point.

It is yet an additional object of the present invention to provide a fountain pen having a plastic writing point terminating in a metal writing tip.

It is a further object of the present invention to provide an improved fountain pen having an omnidirectional, all-metal writing point.

It is another object of the present invention to provide a writing point for a fountain pen, which is made up a plurality of elongated strands in a compact bundle.

It is a further object of the invention to provide an improved writing point for a fountain pen made up of a plurality of similar strands of plastic, which, in a bundle, provide contiguous capillary paths for ink for the entire length of the strands.

It is yet another object of the invention to provide an improved writing point for a fountain pen made up of a plurality of molded strands of plastic which can be rolled into a bundle and inserted into a pen barrel.

It is yet an additional object of the present invention to provide an improved writing point for a fountain pen made up of a plurality of strands radially cast from a central stem which when inserted into a pen barrel collapse to form a solid body having contiguous capillary ink paths extending the length of the point.

It is a further object of the invention to provide an improved writing point for a fountain pen made up of a plurality of individual strands which are cast or molded in a predetermined shape with a predetermined texture to the surfaces for providing capillary ink paths between adjacent strands.

It is yet an additional object of the invention to provide a polygonal point for a fountain pen which, when inserted in a circular orifice, provides a plurality of vent passages to the ink reservoir.

It is still an additional object of the present invention to provide an improved point for fountain pens made up of a plurality of individual strands bonded together by a web member, which enables the strands to be rolled into an elongated solid for insertion into a pen barrel.

It is still an additional object of the present invention to provide a multi-strand writing point assembly for a fountain pen which includes shoulders molded on the individual strand elements to limit the depth of insertion of the point assembly in the fountain pen barrel.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

Figures 3A, 4:
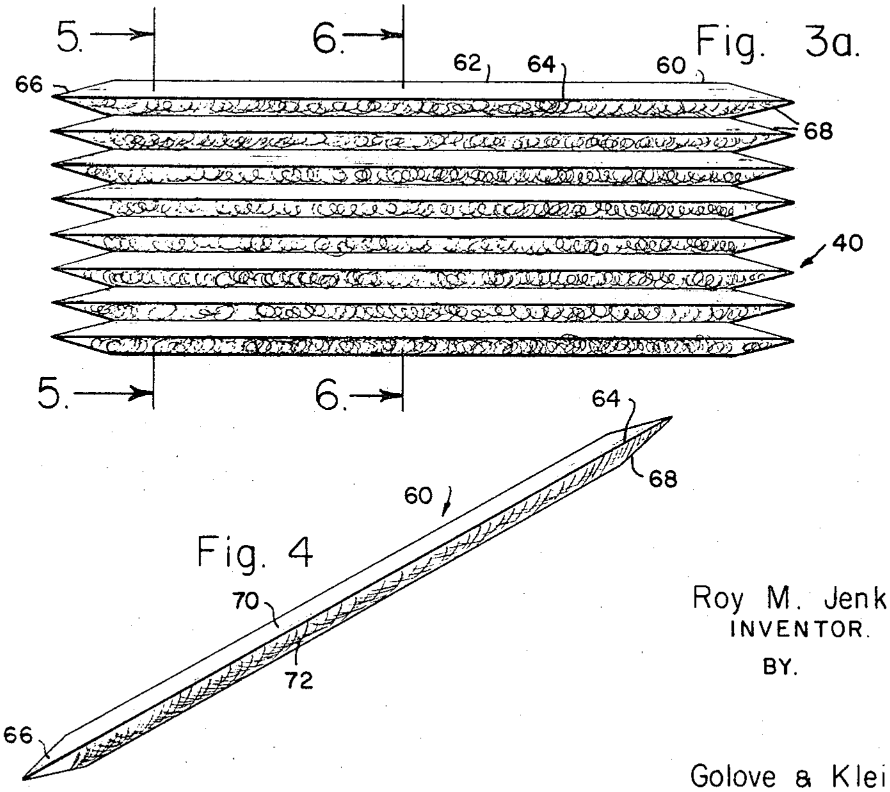
Figure 3B:
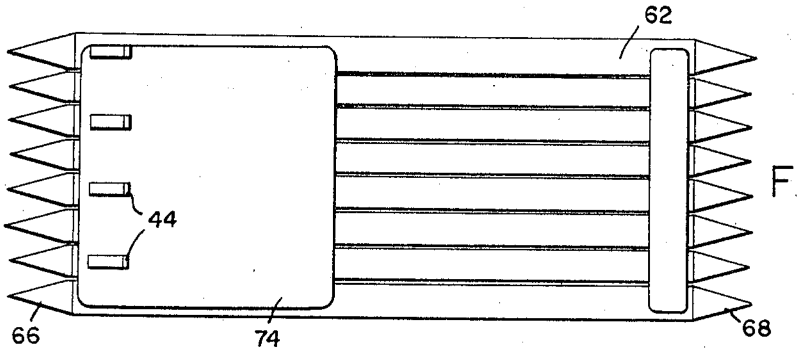
Figure 3C:
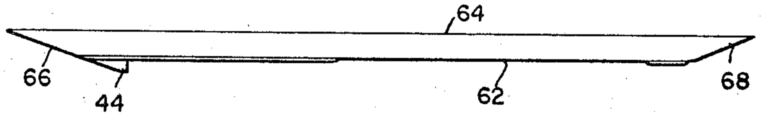

FIG. 3, including FIGS. 3*a*, 3*b* and 3*c* is a view of a preferred embodiment of a point assembly for use with the fountain pen with the present invention in which FIG.

Figure 2:
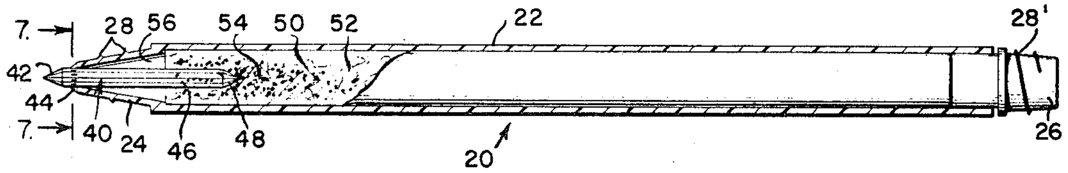
FIG. 2 is a side sectional view of the pen of FIG. 1.
Figures 5, 6, 8:
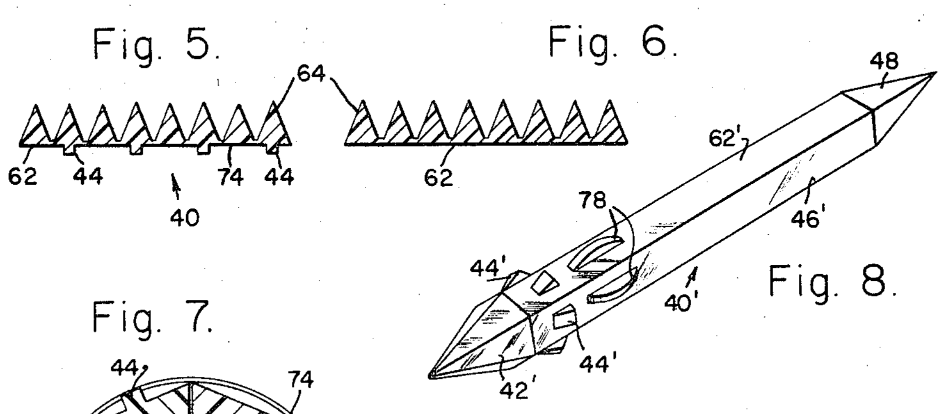
Figure 7:
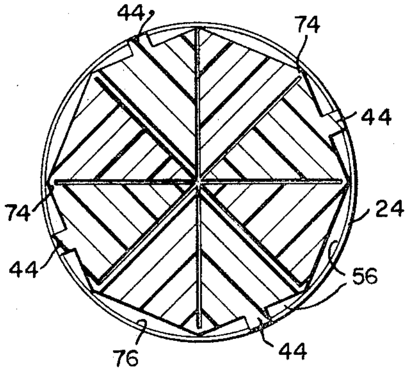
Figure 14:
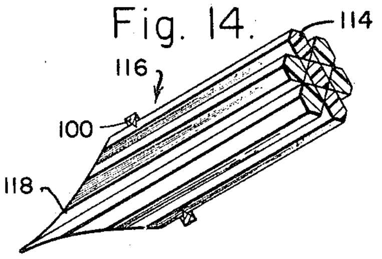
Figure 16:
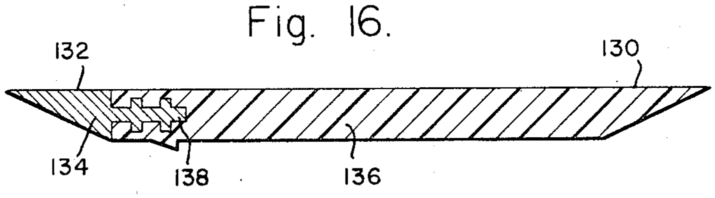
Figure 15:
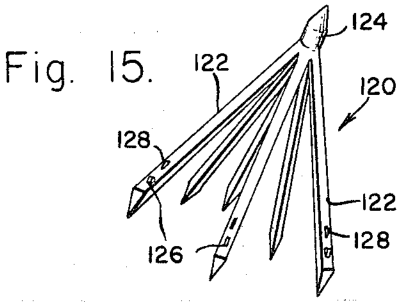
Figure 9:
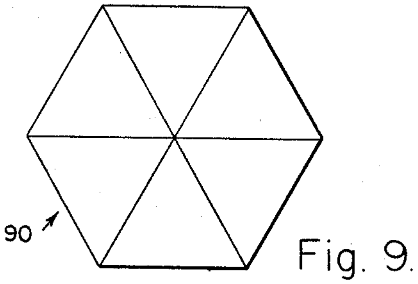
Figure 10:
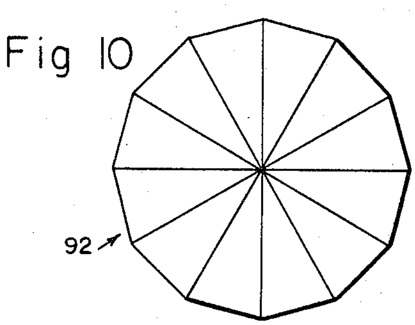
Figure 11:
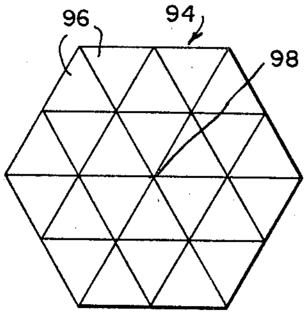
Figure 12:
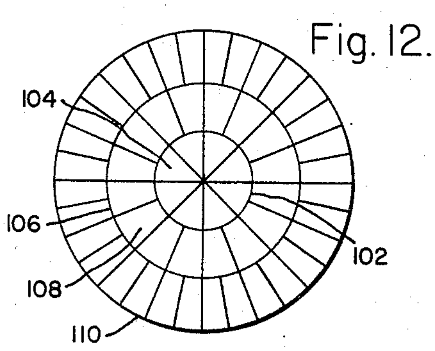
Figure 13:
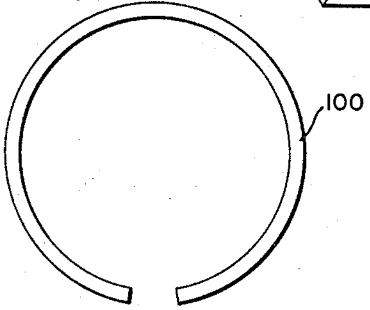

3*a* is a top view of a plurality of triangular strands showing the "interior" sides of the strands;

FIG. 3*b* is a bottom view of the strands of FIG. 3*a* showing the base or outside surfaces of the strands;

FIG. 3*c* is a side view of the strands of FIGS. 3*a* and 3*b*;

FIG. 4 is a perspective view of an individual strand of a point assembly showing, in greater detail the texturing of the interior surfaces thereof;

FIG. 5 is an end sectional view of the point assembly of FIG. 3*a* taken along the line 5—5 in the direction of the appended arrows;

FIG. 6 is an end sectional view of the point assembly of FIG. 3*a* taken along the line 6—6 in the direction of the appended arrows;

FIG. 7 is an enlarged front view of the point assembly of FIG. 2 taken along line 7—7 in the direction of the appended arrows;

FIG. 8 is a perspective view of an alternative point assembly according to the present invention;

FIG. 9 is a cross section view of a six stranded point assembly according to the present invention;

FIG. 10 is a cross section view of a twelve stranded point assembly according to the present invention;

FIG. 11 is a cross sectional view of a hexagonal point assembly according to the invention comprised of a plurality of equilateral triangular strands;

FIG. 12 is a cross section view of yet another point assembly comprised of strands forming segments of annular concentric cylinders to form a columnar point assembly;

FIG. 13 is a top view of a retaining ring adapted for use in the present invention;

FIG. 14 is yet another embodiment of a point assembly in which hexagonal strands are bundled together to form a point assembly;

FIG. 15 is a perspective view of yet another configuration of a plurality of strands radiating from a central stem;

FIG. 16 is a side sectional view of a strand having a metal point; and

Figure 17:
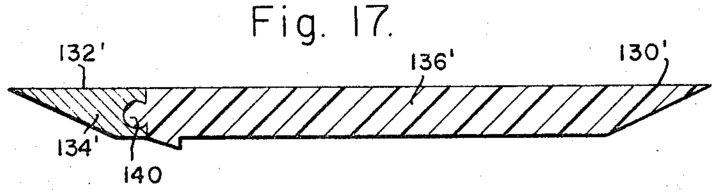

FIG. 17 is a side sectional view of yet another strand having a metallic point.

Figure 1:
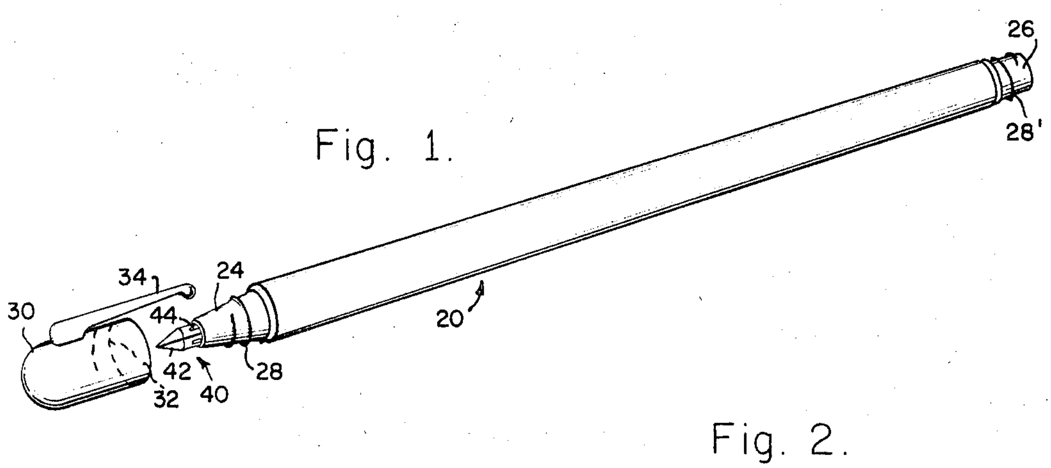
FIG. 1 is a perspective view of a fountain pen according to the present invention.

Turning first to FIG. 1, there is shown a typical fountain pen 20 according to the present invention. The pen 20 includes a barrel 22, terminating at the forward end in an apertured nose piece 24, and, at the rearward end in a removable filling cap 26. The rearward end may be used to fill the pen with writing fluid. As shown, the nose piece 24 is also provided with a spiral thread 28, and the filling cap 26, has a similar spiral thread 28'.

A protective cap 30, has on the internal surface thereof, a matching thread 32, which is adapted to engage the thread 28 of the nose piece 24, as well as the thread 28' of the filling cap 26. A molded clip member 34 is provided on the cap 30 so that when the cap 30 is closed onto the nose piece 24, the clip 34 in cooperation with the barrel portion 22, provides a clip to be used with a garment pocket.

A point assembly 40 is fitted into the nose piece 24, and a writing tip 42, projects therefrom at a desired distance, determined by the placement of a plurality of shoulders or bosses 44. The shoulders 44 engage the nose piece 24, and limit the depth of insertion of the pen point assembly 40 into the pen barrel 22.

Turning next to FIG. 2, there is shown a side sectional view of the fountain pen 20 of FIG. 1. Within the pen barrel 22, there is a reservoir area 50 which, in the preferred embodiment is occupied by a cylinder 52 of a highly porous, fibrous material, capable of absorbing and holding, by capillary attraction, a substantial quantity of ink or writing fluid 54. Alternatively, the ink may be stored in the reservoir using a plastic or other sac or possibly a relatively thin disk of porous fibrous material between the point and the liquid ink supply to act as a "capillary valve" to prevent leakage around the point or through the air vent.

As shown in FIG. 2, an air passage 56 is necessary to communicate between the reservoir 50 and the atmosphere to maintain pressure equilibrium as ink is used. The air passage 56 through areas between the point assembly 40, and the interior surface of the nose piece 24 avoids the need to perforate the barrel 22 or the filling cap 26.

In a preferred embodiment, the pen 20 is assembled by first inserting the cylinder 52 of absorbent material into the reservoir area 50 of the pen barrel 22. Next, a precisely metered amount of ink or writing fluid 54 is added to the reservoir area 50 where it is absorbed and held by the cylinder 54. The filling cap 26 is then inserted in place. The filling cap 26 can be permanently fastened or can be provided with a frictional, but air tight fit. If the cylinder is not used, some other equivalent structure should be employed to keep the ink from leaking out around the point assembly 40.

Next, the point assembly 40 is inserted through the orifice of the nose piece 24, and forced into the interior of the pen barrel 22. Preferably the fit of the point assembly 40 in the nose piece 24 is a tight one. The piercing tip of the feed taper 48 enters the cylinder 52 of absorbent material and establishes contact with the writing fluid 54, stored therein. The point assembly 40 is forced into the pen barrel 22 until the shoulders 44 engage the nose piece 24.

Writing fluid 54 is conducted to the writing tip 42 through capillary action within the point assembly 40, to be explained in greater detail below. When the writing fluid has reached the tip, the pen is ready for writing. The protective cap 30 is placed on the nose piece 24. An air tight fit is formed after the mating threads 28, 32 have been fully engaged by rotation of the cap 30. With the cap in place, the air tight seal thus formed tends to prevent evaporation of the writing fluid. The clip portion 34 can be used to hold the pen 20 securely in a pocket. To write, the cap 30 is removed and placed for safekeeping on the filling cap 26, where it can be secured in place by the mating threads.

The pen may then be employed for writing in the well known manner. Only a light touch need be employed as the capillary flow of fluid to the point assures a plentiful supply at the writing tip.

Turning to FIGS. 3 through 7, there is shown a preferred embodiment of a point assembly 40 according to the present invention. In a preferred method of producing the point assembly 40, a plurality of strands are cast, in a "parallel" mold, each strand having a surface in a common plane. Satisfactory points have been produced from an acetal copolymer, commercially available under the trademarks Cellon or Delrin. Other assemblies have been made of linear polyethylene and even polypropylene has been used. The choice of a plastic material is, of course, closely related to the choice of writing fluid and the compatability of one with the other.

In FIG. 3*a*, there is shown an eight-strand assembly, each strand 60 of triangular cross section. In this embodiment, each is provided with an apex angle roughly approximating 45° with a permissible variation of −30'. The exact amount by which the angle can be less than 45° depends upon surface texture and the properties of the writing fluid. The angle can be expressed as 44° 30' ±30'. It will be apparent that if the angle is much less than 45° with an octagonal assembly, the space between adjacent strands will exceed capillary dimension except for a very small area.

FIG. 3*b* shows the bases of the strands 60, with the base surface 62 in the common plane. As shown in FIGS. 3*a*, 3*b* and 3*c*, each strand 60 is provided with a leading taper 66 and a feed taper 68. The apex edge 64, however, is perfectly straight and, in this embodiment is aligned in parallel with those of the adjacent strands.

The "inner" surfaces of the strands have differing cooperating textures 70, 72. A pair of webs 74, best seen in FIG. 3*b* molds the strands together into an integral unit. The webs 74 are easily produced by relieving areas on the cooperating opposite half of the mold so that corresponding areas of web are produced upon casting.

In FIG. 4, there is shown a single strand 60, in which the surface texturing is illustrated in somewhat greater detail. It has been found experimentally, that a satisfactory point assembly can be assembled from a plurality of strands in which one, inner face is textured by the plurality of parallel, longitudinal striations or scratches 70, which cooperate with the plurality of circular striations or scratches 72 on the adjacent, inner face.

When the plurality of strands 60 is formed into a finished point assembly 40, the strands 60 are arranged so that a surface having longitudinal or parallel scratches 70 is always next adjacent a surface having circular scratches 72. The texturing of the surfaces of the mold in which the strands are produced. It has been found, that the scratches normally caused by the milling out of the mold, produces adequate surface texturing on the finished strands 60.

FIGS. 5 and 6 are cross sections of the plurality of strands comprising a point assembly 40 in an unassembled configuration. FIG. 5 is a view taken through shoulders 44 while FIG. 6 is a cross section taken approximately through the center of the strands. While FIG. 6 shows each strand to be in fact an individual separate element, FIG. 5 shows the thickened web portion 74, which joins the adjacent strands in an integral unit.

To place a point assembly 40 in use, the plurality of strands 60 are rolled into a compact polygonal bundle, with the plurality of apices 64 coming together at a single central axial line. FIG. 7 is an enlarged end view of a point assembly 40, fully assembled and inserted into the opening or orifice 76 of the nose piece 24. As seen in FIG. 7, the bundling of the plurality of strands results in a regular, eight-sided polygon, which is circumscribed and frictionally held by the nose piece 24. Shoulders 44 cast on alternate strands, engage the nose piece 24 to limit the depth to which the point assembly 40 is inserted.

The point assembly is maintained in its polygonal shape by the pressure of the circumscribing orifice 76 which, in combination with the web 74, holds the strands 60 together. The space between the "flat" sides of the polygon and the circular orifice 74 functions as a breathing vent between the reservoir 50 and the outside environment. Such a structure easily provides adequate ventilation to the reservoir during the writing fluid withdrawal.

FIG. 8 is a perspective view of an alternative point assembly 40' in which a plurality of boss or cam surfaces 78 are provided on the base surfaces 62', immediately behind the shoulders 44'. These serve to reinforce the wedging action of the orifice 76 on the corners of the polygon and provide added support and frictional pressure to the midpoint of each of the strands 60.

The bundle of strands, when compacted, forms a major capillary surface between all adjacent inner faces, including a central capillary channel where the apices meet. The texturing of the individual surfaces of the strands provides minor capillary paths for writing fluid so that a substantial supply of writing fluid "travels" from the reservoir to the writing tip.

Still other alternative embodiments of point assemblies are shown in FIGS. 9 through 12, inclusive, which are cross section views of the other configurations that a point assembly might take. For example, FIG. 9 is a cross section of a regular hexagonal point assembly 90 comprised of six triangular strands bundled together.

FIG. 10 shows a similar structure, in this case a dodecagon or twelve-sided polygon 92, comprised of twelve, triangular strands bundled together. Similarly, sixteen triangular strands (not shown) could be utilized to form still another bundle having sixteen "sides." In all of these embodiments, there is the continuing requirement that the apex angle of each strand be no greater than 360°/*N*, where N is the number of strands. A certain nominal amount of leeway is permitted by which the angle might be less than 360°/*N*, depending on the capillary properties of the ink and the strand material. For example, the angle might be better expressed as $$\left(\frac{360°}{N}-30'\right)\pm 30'$$

The difference is permitted so that if the adjacent surfaces are not adequately textured, the capillary surfaces are not completely closed off when the strands are compressed into the polygon.

Turning next to FIG. 11, there is shown a departure from what has heretofore been a single "layer" of strands, each of substantially triangular cross section and each having an apex angle no greater than 360°/*N*, where N is the number of strands in the bundle forming the regular polygon.

In FIG. 11, point assembly 94, is made up of a plurality of strands 96 of equilateral triangular cross section, which are arranged in a larger polygon of hexagonal shape with a central, axial line 98. As shown, some twenty-five identical strands 96, bundled together form the larger, hexagonal prism, point assembly 94, whose exterior faces are made up of two adjacent strand surfaces. The bundle can be held together by a split ring 100, as shown in FIG. 13, or by frictional engagement with the orifice of a nose piece, of suitable diameter.

If the individual strands 96 are drawn or extruded, then tapers must be ground or machined onto the finished bundle. If molded or cast, a plurality of flat, parallel type molds can be provided, or a "flower-type" configuration, explained below in connection with FIG. 15, can be employed.

FIG. 12 shows a similar approach, in which an inner core 102 is formed of strands 104 of a "pie" shape, which when bundled together produce a cylindrical column. A concentric annular cylinder 106 is made up of a plurality of strands 108 each having the cross section of a sector of the annular ring 106 and, as shown, a second annular cylinder 110 is provided, surrounding the first annular cylinder 106. Alternatively, the individual strands of the outer most annular cylinder 110 could be provided with plane exterior surfaces, so that the bundled strands would have the appearance of a polygon, rather than a cylinder.

A split ring 100, such as shown in FIG. 13 may be used both to hold the strands in a bundle and to limit the depth of insertion of the point assembly. The ring may have a sharpened inner periphery 112 so that the outer strands are slightly deformed by contact with the ring 100, thereby preventing sliding of the ring 100 in the axial direction.

In FIG. 14, yet another alternative embodiment of a point assembly is shown, in which a plurality of strands 114 of polygonal cross sections are bundled to form a point assembly 116 and held by a split ring 100. As shown the stands 114 are hexagonal and may be drawn or extruded and cut to proper length. When bundled, and held by the ring 100, a suitable taper 118 may be ground or otherwise formed, to produce a writing tip. The taper 118 can assume virtually any configuration from a "hollow ground," hyperboloid of revolution, (as shown), to a hemisphere (not shown). The "hollow ground" shapes permit substantial point wear without degradation of the width of the written mark. Other special shapes may be provided for any desired mark or line.

Turning next to FIG. 15, there is shown yet another configuration for an unassembled point structure 120, which is suitable for molding or casting. A plurality of 124. With a sufficiently flexible material, the individual strands 122 radiate from a central core member or stem strands 122 can be bundled together to assume the same point assembly configuration achieved by the casting of strands in parallel, such as illustrated in FIG. 3.

In the point structure 120 of FIG. 15, similar shoulders 126, and, where desired, cam surfaces 128, can be molded into the exterior sides of the strands. In substantially all aspects, the point structure 120 will be identical to the point assembly 40 of the preferred embodiment. However, the strands 60 of the preferred embodiment are joined by the webs 74 that form fairly wide lateral bands, yet in the instant embodiment, the strands 122 are joined only at one end.

The embodiments of FIGS. 11 and 12 might also be cast as a plurality of radiating strands from a central "stem." Such a mold is well within the skill of the plastics molding art, and accordingly will not be dealt with herein. It is sufficient to note that the finished point assembly will consist of a plurality of strands having interfitting adjacent surfaces to provide major capillary surfaces. The adjacent surfaces are so textured to provide minor capillary paths within each surface. The shapes of the individual strands and the methods of porducing the strands are limited only by the ingenuity of the designer of the mold or die, without necessarily requiring the exercise of inventive skill.

Turning next to FIGS. 16 and 17, there are shown still other embodiments of strands 130 suitable for use in the present invention. If an all metal strand is considered undesirable, a composite strand may be utilized. A tapered point 132 forms the writing tip and is made of a hard, corrosion resistant metal 134, which is embedded or otherwise anchored to the plastic material 136, of the remainder of the strand 130.

As seen in FIG. 16, the metal point 132 has a post 138 extending therefrom about which the plastic material 136 is molded. FIG. 17 shows a similar metal point 132' which contains an opening 140 into which plastic material 136 has been injected for a firm connection.

The embodiments of FIGS. 16 and 17 are primarily intended for use in a permant type fountain pen, in which the point is expected to undergo little or no wear through use. Accordingly, the pen is adapted to be refilled with ink. Where the added expense can be justified, the individual strands themselves can be entirely comprised of metal, although it is believed that plastic strand might provide better capillary surfaces and capillary paths.

Thus there has been described a new and improved fountain pen as well as a new writing point assembly for a fountain pen. The pen combines many of the advantages of the conventional fountain pen with other advantages peculiar to a ball point pen. Further, the present pen also embodies many features of the wick-type marking pen, but provides a smooth, long wearing point that does not degrade the quality of the line produced over a period of time.

What is claimed as new is:

1. A writing point for a fountain pen comprised of a plurality of similar, elongated elements, each element including:

a first inner surface having a first predetermined pattern formed thereon, and a second inner surface having a second predetermined pattern formed thereon, said first and second predetermined pattern being different whereby a first inner surface, in intimate contact with a second inner surface for substantially the length of their respective elements, provides a plurality of contiguous paths of capillary dimensions for writing fluid, extending the length of the elements.

2. An element adapted for use in a writing point assembly for a fountain pen in combination with other, similar, elements, comprising:

an elongated, non-absorbent solid having a first inner surface, a second inner surface and an outer surface;

a shoulder mounted on said outer surface adapted to engage a pen barrel to limit the insertion of the point therein;

a writing tip, having a uniform taper from said outer surface toward said inner surfaces; and inscribed texturing on said inner surfaces of predetermined depth and pattern, the pattern on one surface being different from the patern on the next adjacent surface for providing, as between contacting inner surfaces of adjacent similar elements, paths of capillary dimensions for writing fluid extending the length of said element to said writing tip for transporting writing fluid thereto.

3. The combination with a fountain pen including a barrel portion, a reservoir portion within the barrel portion, and an orifice in one end of the barrel portion communicating with the reservoir portion of a writing point adapted to be inserted into the barrel portion orifice comprising:

a plurality of elongated elements of non-absorbent material, said plurality of elements being adapted to be bundled into a substantially solid, elongated structure, adjacent surfaces of said elements having respectively different pattens inscribed and textured therein, for providing contiguous paths of capillary dimensions for writing fluids extending the length of said elements when said elements are bundled together and inserted into the pen barrel orifice.

4. The writing point of claim 3 above, wherein the pattern on one of a pair of adjacent surfaces is substantially curvilinear and the pattern on the other of a pair of adjacent surfaces is substantially rectilinear.

5. The writing point of claim 3 above, wherein each element has a tapered, writing tip of metal.

6. The writing point of claim 3 above, wherein each of said elements is made entirely of metal.

7. The writing point of claim 3 above, wherein each of said elements is made entirely of a plastic.

8. The combination with a fountain pen including a barrel having a writing fluid reservoir portion adapted to store writing fluid therein, and an orifice at one end adapted to receive a writing point in fluid communication with the reservoir portion of a writing point comprising:

(a) a stem member adapted to engage the reservoir portion of the barrel;

(b) a plurality of strands, each attached at one end to said stem member and extending radially therefrom, each of said strands adapted, respectively, to interfit with adjacent strands to form an elongated solid; and (c) writing fluid path means including predetermined inscribed textured patterns on adjacent interfitting strand surfaces, said patterns on a one surface being different from the pattern on the next adjacent surface, said interfitting strand surfaces cooperating to provide contiguous paths of capillary dimensions for writing fluid, extending substantially the length of said strands when said strands are bundled to form an elongated solid.

9. The writing point of claim 8 above, wherein each of said strands is an elongated triangular prism having an apex angle of substantially 360°/N, where the plurality of strands consists of N strands, to form an N-stranded writing point having a regular, geometric shape.

10. The writing point of claim 8 above, wherein at least one of said strands includes an outwardly projecting shoulder on an exterior surface thereof adapted to engage the barrel at the orifice thereof, to limit inward insertion of said writing point.

11. The combination with a fountain pen including a barrel having a writing fluid reservoir portion adapted to store writing fluid therein and an orifice at one end adapted to receive a writing point in fluid communication with the reservoir portion of a writing point comprising:

(a) a plurality of N elongated strands, each having a base side and a pair of inner sides meeting at an acute angle approximately equal to but less than 360°/N, each of said strands adapted, respectively, to interfit with adjacent strands to form an elongated, N-stranded solid; and (b) writing fluid path means including predetermined inscribed textured patterns on adjacent interfitting strand inner surfaces said pattern on a one surface being different from the pattern on the adjacent interfitting surface, said surfaces cooperating to provide contiguous paths of capillary dimensions for writing fluid, extending the length of said strands when said strands are bundled to form an elongated solid, with all inner sides being held in close proximity, with each other.

12. The writing point of claim 11 further including intercoupling means connecting the base sides of all of said strands into an integral unit, said intercoupling means being operable to retain said strands in a rolled configuration when said strands are bundled.

13. The writing point of claim 11 further including shoulder means mounted on the base surface of some of said strands for limiting the inward travel of the writing point in the barrel orifice.

References Cited

UNITED STATES PATENTS

| | | | |
|---|---|---|---|
| 1,613,811 | 1/1927 | Funk | 120—51 |
| 2,528,408 | 10/1950 | Zodtner | 120—50 |
| 3,003,181 | 10/1961 | Rosenthal | 15—563 |
| 3,203,025 | 8/1965 | Schreur | 15—563 |

FOREIGN PATENTS

| | | |
|---|---|---|
| 26,585 | 11/1910 | Great Britain. |
| 586,917 | 4/1947 | Great Britain. |
| 413,764 | 7/1934 | Great Britain. |
| 396,082 | 5/1924 | Germany. |

ROBERT W. MICHELL, *Primary Examiner.*

U.S. Cl. X.R.

15—447; 401—199, 258